(12) United States Patent
Malone et al.

(10) Patent No.: US 7,426,110 B2
(45) Date of Patent: *Sep. 16, 2008

(54) CENTRIFUGAL FAN CLUTCH FOR AN ELECTRONICS COOLING FAN

(75) Inventors: Christopher G. Malone, Loomis, CA (US); Glenn C. Simon, Auburn, CA (US); Ricardo Espinoza-Ibarra, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/260,105

(22) Filed: Oct. 26, 2005

(65) Prior Publication Data

US 2007/0092370 A1    Apr. 26, 2007

(51) Int. Cl.
*H05K 7/20* (2006.01)
*H02K 9/06* (2006.01)
*F01D 15/12* (2006.01)
*F04B 9/00* (2006.01)

(52) U.S. Cl. .................... 361/695; 310/50; 416/123; 417/319; 361/694

(58) Field of Classification Search .................. None
See application file for complete search history.

(56) References Cited

U.S. PATENT DOCUMENTS

| 1,583,621 | A | * | 5/1926 | Steinberg ............... 60/597 |
| 2,771,143 | A | * | 11/1956 | Campbell ............... 416/123 |
| 3,367,465 | A | * | 2/1968 | Newman ............ 192/105 BA |
| 3,680,674 | A | * | 8/1972 | Horstman ............ 192/105 BA |
| 4,018,406 | A | * | 4/1977 | Parsons ................. 244/98 |
| 4,960,194 | A | * | 10/1990 | Sageshima et al. ...... 192/103 B |
| 5,546,272 | A | * | 8/1996 | Moss et al. ............. 361/687 |
| 5,845,757 | A | | 12/1998 | Csonka |
| 6,000,519 | A | | 12/1999 | Becker et al. |
| 6,425,739 | B1 | | 7/2002 | Ambler |
| 2004/0209725 | A1 | | 10/2004 | Chonan et al. |
| 2004/0224806 | A1 | | 11/2004 | Chonan |
| 2006/0165538 | A1 | * | 7/2006 | Barsun et al. .............. 417/319 |

FOREIGN PATENT DOCUMENTS

JP    406069673    *  3/1994    ............ 417/410.1

* cited by examiner

*Primary Examiner*—Gregory D Thompson (57) ABSTRACT

An electronics cooling fan comprises a centrifugal clutch adapted to disengage and freewheel upon fan failure.

17 Claims, 6 Drawing Sheets

CENTRIFUGAL FAN CLUTCH FOR AN ELECTRONICS COOLING FAN

BACKGROUND OF THE INVENTION

Electronic systems and equipment such as computer systems, network interfaces, storage systems, and telecommunications equipment are commonly enclosed within a chassis, cabinet or housing for support, physical security, and efficient usage of space. Electronic equipment contained within the enclosure generates a significant amount of heat. Thermal damage may occur to the electronic equipment unless the heat is removed.

Electronic systems commonly include heat-dissipating components such as processors, central processing units (CPUs), signal processors, and others. One or more fans are used to push air through the system and over components to avoid overheating of the heat-dissipating components. In recent years electronic systems have become more densely packaged so that system design within power and heat dissipation allowances has become more difficult. This system evolution creates design challenges in aspects of power consumption and the effect of fans on overall system heat dissipation characteristics.

An electronics system may have multiple fans including, for example, multiple fans arranged in series to supply sufficient cooling and redundancy in case of failure of one or more fans. If one or more of the series-connected fans fails due to any of various mechanical or electrical failures, power failure or shutdown due to attempts to operate above a system power budget, physical obstruction of a fan rotor, or the like, the failed fan may create a drag on cooling airflow through the system. Drag in the airflow pathway can result in increased demand on other fans, overheating of electronic components and devices, and degradation in electronics performance. Electronics cooling fans typically fail when motor bearing lubricant dries, which may result in a locked rotor. Fan failure may create heavy resistance to airflow through the electronics system due to blockage created by stationary fan blades.

SUMMARY

In accordance with an embodiment of a cooling apparatus, an electronics cooling fan comprises a centrifugal clutch adapted to disengage and freewheel upon fan failure.

BRIEF DESCRIPTION OF THE DRAWINGS

Embodiments of the invention relating to both structure and method of operation may best be understood by referring to the following description and accompanying drawings whereby.

DETAILED DESCRIPTION

A common cause of failure in an electronics cooling fan is drying of motor bearing lubricant. Dried lubricant can result in a locked rotor, which may create a massive resistance to air flow through an electronics system due to blockage of stationary fan blades. Additional of a simple centrifugal clutch to a fan enables the fan blades to rotate freely, thereby reducing flow resistance.

A centrifugal clutch is activated and deactivated on the basis of applied centrifugal forces in a simple, effective structure and technique that is triggered by rotation of an attached fan motor. When the motor slows or stops, the centrifugal clutch disengages, enabling the fan blades to rotate independently of the motor. The centrifugal clutch may be implemented in a fully mechanical structure.

Figure 1:
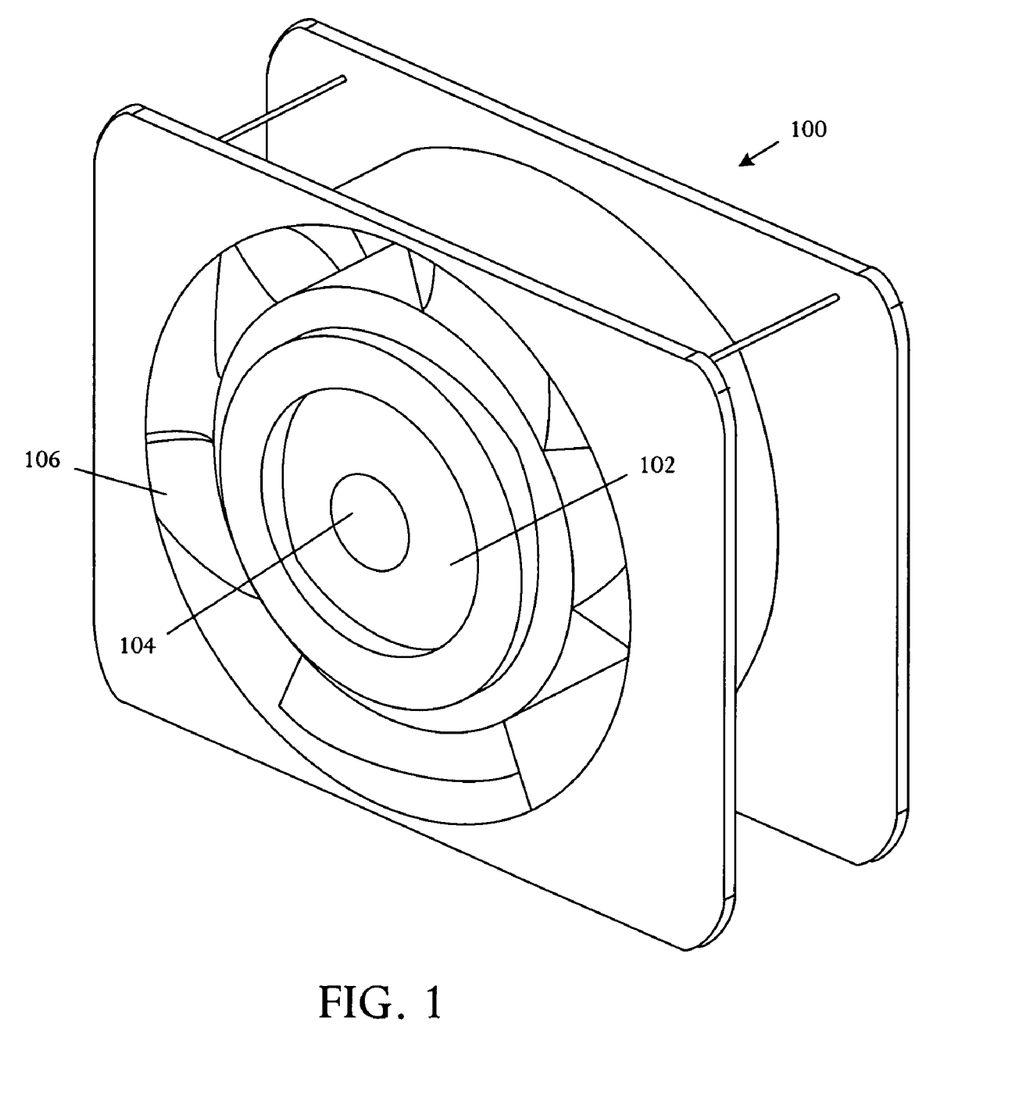
FIG. 1 is a perspective pictorial diagram depicting an embodiment of an electronics cooling fan comprising a centrifugal clutch which is adapted to disengage and freewheel upon fan failure.

Referring to FIG. 1, a perspective pictorial diagram illustrates an embodiment of an electronics cooling fan 100 comprising a centrifugal clutch 102 which is adapted to disengage and freewheel upon fan failure.

In an illustrative embodiment, the electronics cooling fan 100 may further comprise a motor 104 and a blade assembly 106. The centrifugal clutch 102 rotationally couples the motor 104 and the blade assembly 106 with the centrifugal clutch 102 engaging and driving rotational motion of the blade assembly 106 in response to centrifugal force generated by the motor 104.

The illustrative centrifugal clutch 102 is further designed to disengage, thereby enabling the blade assembly 106 to freewheel in response to a predetermined reduction in centrifugal force.

The electronics cooling fan 100 overcomes failure of the motor 104 including any and all aspects of motor operation such as functionality of electronics, bearings, windings, and any other component. When the motor 104 fails in any operational aspect, the motor 104 ceases angular motion or spinning, thereby causing the centrifugal clutch 102 to retract and the fan 100 to freewheel.

Figure 2A:
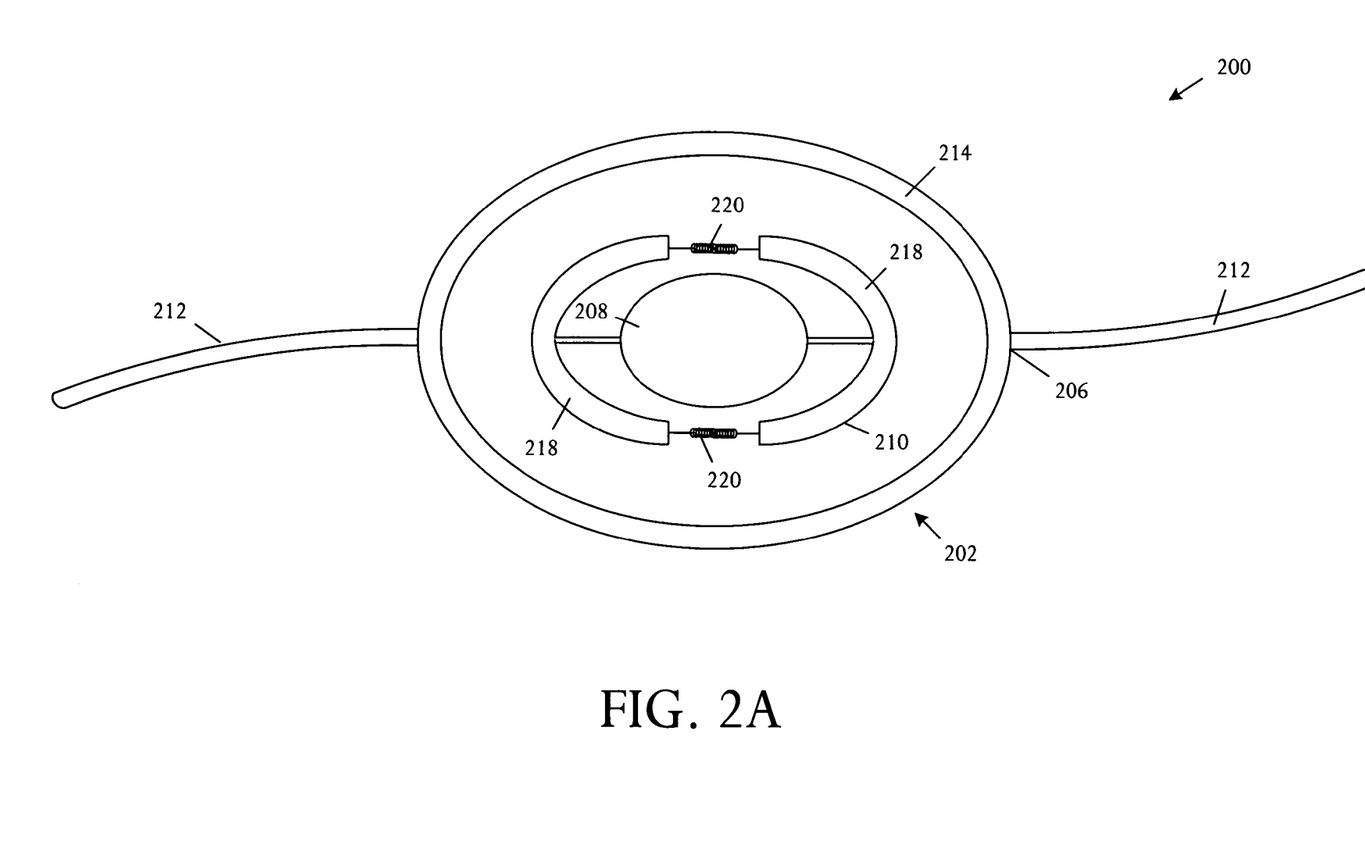
FIGS. 2A, 2B, and 2C, are a frontal view, a perspective pictorial view, and a cross-sectional view respectively illustrating an embodiment of an electronics cooling fan which includes a centrifugal clutch adapted to disengage and freewheel upon fan failure.
Figure 2B:
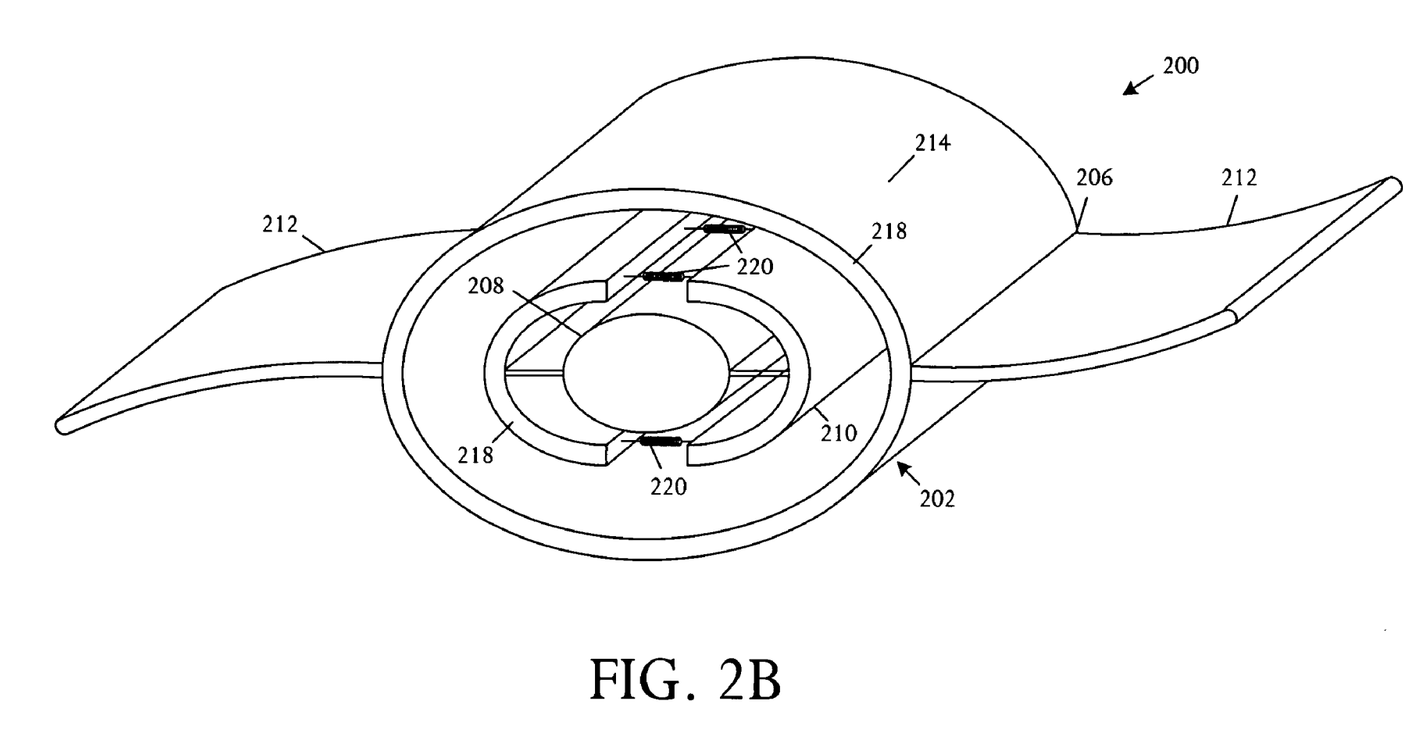
Figure 2C:
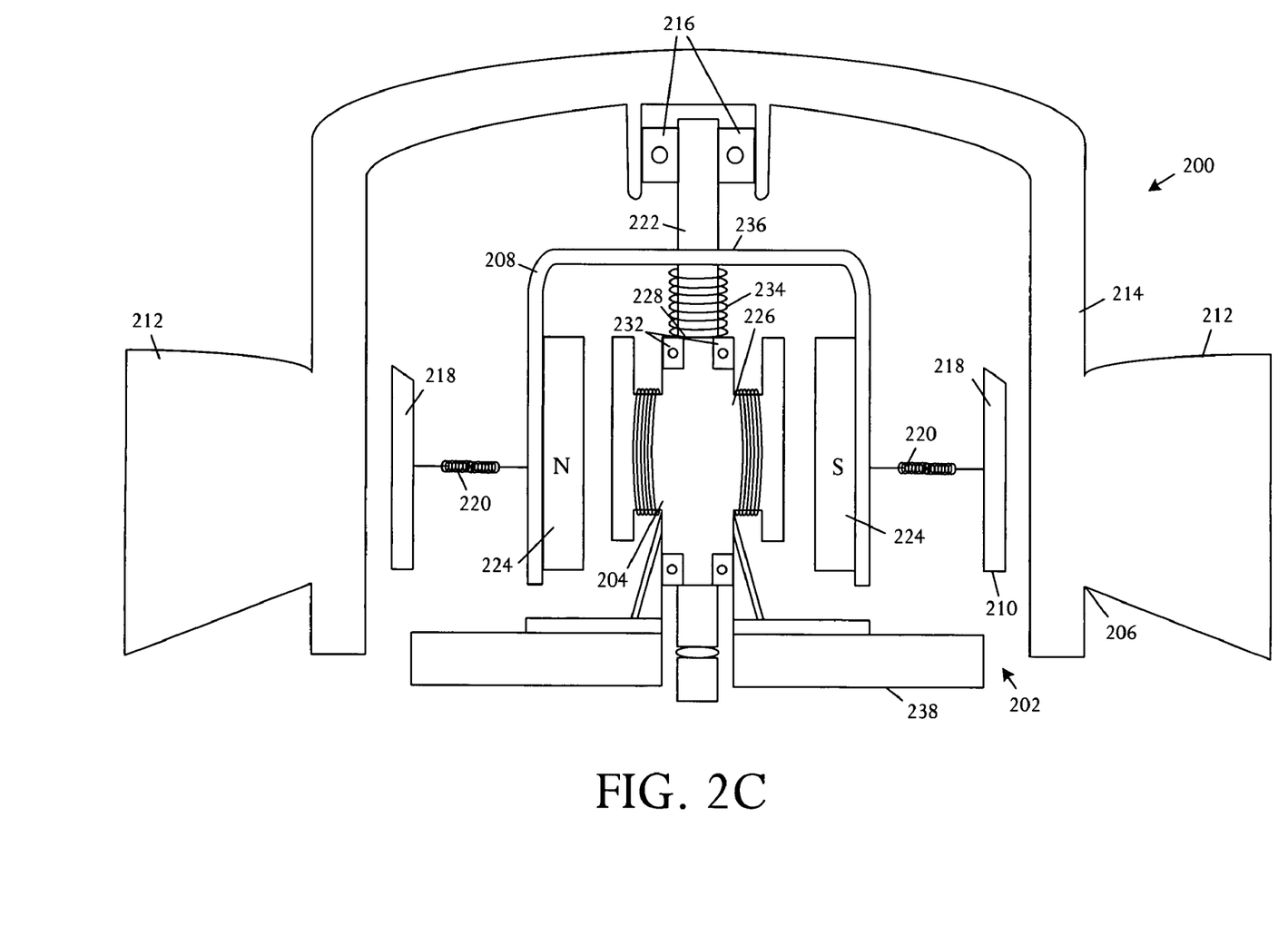

A fan typically fails as a result of the fan motor or fan bearings seizing in place, causing fan blades to freeze into position. In a system with multiple fans, stationary fan blades resulting from failure can block airflow, potentially causing the internal system temperature to rise. An illustrative fan which incorporates a centrifugal clutch enables a failed fan to freewheel, eliminating blockage and allowing airflow to be maintained. Referring to FIGS. 2A, 2B, and 2C, a frontal view, a perspective pictorial view, and a cross-sectional view respectively illustrate an embodiment of an electronics cooling fan 200 which includes a centrifugal clutch 202 adapted to disengage and freewheel upon fan failure. The electronics cooling fan 200 comprises a direct current (DC) motor 204, a hub 208 coupled to and driven by the direct current motor 204, and a clutch weight assembly 210. The clutch weight assembly 210 is positioned radially surrounding the hub 208 and has an inner surface conformal to an outer surface of the hub 208. The electronics cooling fan 200 also has a fan blade assembly 206 including one or more fan blades 212. An outer drum 214 is positioned radially surrounding the clutch weight assembly 210 and has an inner surface which is conformal to an outer surface of the clutch weight assembly 210. The one or more fan blades 212 are attached to an outer surface of the outer drum 214. The electronics cooling fan 200 further comprises a bearing system 216 that is positioned between the clutch weight assembly 210 and the outer drum 214. The bearing system 216 is designed to enable the outer drum 214 and fan blades 212 to freely spin in conditions of failure of the motor 204 or bearing system 216.

The centrifugal clutch 202 uses centrifugal force to expand a friction device on a driving shaft 222 until the friction device is locked to the drum 214 on the driving shaft 222.

In some embodiments, the clutch weight assembly 210 may include multiple clutch mass segments 218. One or more springs 220 may be configured to couple selected clutch mass segments 218. The springs 220 are configured to retract the clutch mass segments 218 to a position adjacent the hub 208 when the direct current motor 204 is not operating. Rotational speed of the motor 204 generates the active force for the centrifugal clutch 202, driving the clutch mass segments 218 apart, engaging the outer drum 214 and causing the outer drum 214 and attached fan blade assembly 206 to spin. In absence of rotation, the springs 220 cause the clutch mass segments 218 to collapse so that contact to the outer drum 214 is broken, enabling the outer drum 214 and fan blade assembly 206 to freewheel.

The freewheeling fan 200, for example implemented in a redundant fan configuration, forms much less of a restriction to airflow than the blockage created by fixed or stationary fan blades. In a series arrangement of redundant fans, when one of the fans fails with a locked rotor 222 condition the centrifugal clutch 202 enables only a minimal resistance or restriction to air flow driven by the non-failed, operating fan.

In another failure condition, a fan may cease operation due to a bearing failure in which lubricant vanishes or decomposes from the bearing so the bearing seizes and the fan stops. The centrifugal clutch 202 also remedies bearing failure. When the bearing for the fan motor seizes, then the centrifugal clutch 202 is deactivated and the bearing for the drum 214 is enabled to spin freely so that airflow freely passes through the freewheeling blades.

In an illustrative embodiment, the fan 200 may be configured with bearings 216. For example, a bearing 216 may be located adjacent the motor 204 so that motor seizure would cause the centrifugal clutch 202 to collapse, disengaging a rotor 222 from the motor 204. Another bearing 216 may be arranged to enable the blade assembly 206 to freewheel.

The cross-sectional view depicted in FIG. 2C shows locations of the bearings 216 in an illustrative embodiment. The depicted fan 200 has a nested configuration comprising an outer drum 214 and the motor hub 208. Clutch weights 218 are nested within the outer drum 214 and the motor hub 208 is located within the clutch weights 218 of the clutch weight assembly 210. Nested inside the motor hub 208 are a motor magnet 224 and an armature 226. The motor hub 208 contains the motor 204, cam 228, magnet 224, armature 226, and wires wrapped around the armature 226. The rotor or shaft 222 extends generally central to the motor hub 208 and rigidly attaches to the cam 228. Bearings 232 are coupled between the armature 226 and the shaft 222 to enable the armature 226 to slide relative to the shaft 222. A spring 234 is placed on the shaft 222 and positioned between a clutch plate 236 and the armature 226 so that the spring 234 preloads the bearing 232. A printed circuit board 238 is attached to the motor 204 and holds components which control and drive the motor 204. The armature 226 is held in a fixed position and bearings 232 on the shaft 222 enable the shaft 222 to rotate freely. The shaft 222 passes through an aperture in the clutch plate 236 and extends to a bushing 238 in the outer drum 214. A bearing 216 between the shaft 222 and the outer drum 214 or housing enables the outer drum 214 to rotate relative to the shaft 222.

Some fan embodiments may have two bearings 216 so that seizure of one bearing does not prevent the centrifugal clutch 202 from operating to enable freewheeling of the fan. In a particular arrangement with first and second bearings, a first bearing may be commonly in operation when the clutch drives spinning of the blade assembly with the second bearing remaining in reserve for operation when the first bearing no longer is operative. When the centrifugal clutch disengages fan operation, neither bearing is stressed. When the first bearing fails, the second bearing becomes operational and, since previously held in reserve, is typically in good condition.

In the illustrative embodiment, bearing 216 is a redundant bearing which enables free-spinning of the fan blades when the motor or primary bearings 232 fail. During normal operation, centrifugal clutch weights 210 are driven outward when spinning to make contact with the outer drum 214 with attached fan blade assembly 206, thereby spinning the fan blades.

In the event the bearings 216 seize thereby resulting in motor seizure, the clutch 202 is engaged. The bearings 216 do not rotate and the shaft 222 and outer drum 214 rotate together because the shaft 222 is rigidly attached to the cam 228. The clutch 202 fixes the relative position of the cam 228 in the outer drum 214 so that the bearing 216 is fixed and does nothing. Airflow generated by another fan, for example arranged in parallel with the fan 200, passes through the fan 200 which can freewheel, despite seizure of the bearing 216 as the clutch plate 236 attracts.

In various embodiments, any suitable type of bearings may be implemented, for example including sleeve bearings, ball bearings, a tapered roller bearing, or others. The bearings are generally used to constrain, guide or reduce friction in rotary or linear applications. A sleeve bearing functions by sliding action rather than the rolling action of ball, roller and needle bearings. All bearings use lubrication to reduce friction and wear. Various types of bearing systems may be used including fluid film, self-lubricated, hydrostatic, and hydrodynamic bearings In other fan embodiments, a single bearing may be sufficient if the outer drum and fan blade assembly have a suitable low mass and reasonable balance.

FIGS. 2A, 2B, and 2C depict a particular example embodiment of a centrifugal clutch 202. Many different configurations, arrangements, and structures are known for centrifugal clutches, particularly in the automotive industry, for example. Any suitable arrangement may be implemented in accordance with various embodiments of electronics system fans.

Figure 3A:
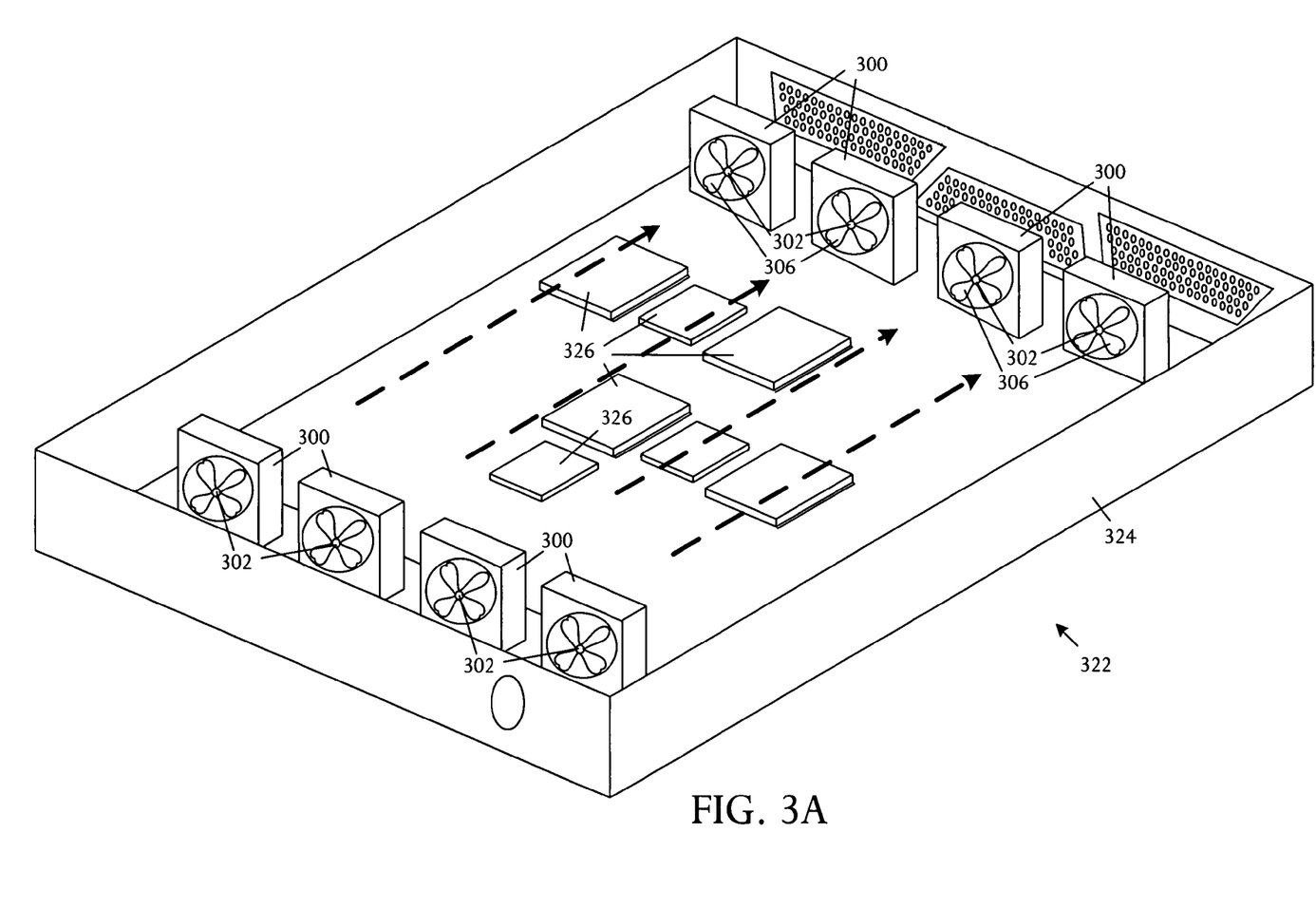
FIGS. 3A and 3B are perspective pictorial diagrams showing example embodiments of electronic systems including electronics cooling fans with centrifugal clutches to enable fan freewheeling in a fan failure condition.
Figure 3B:
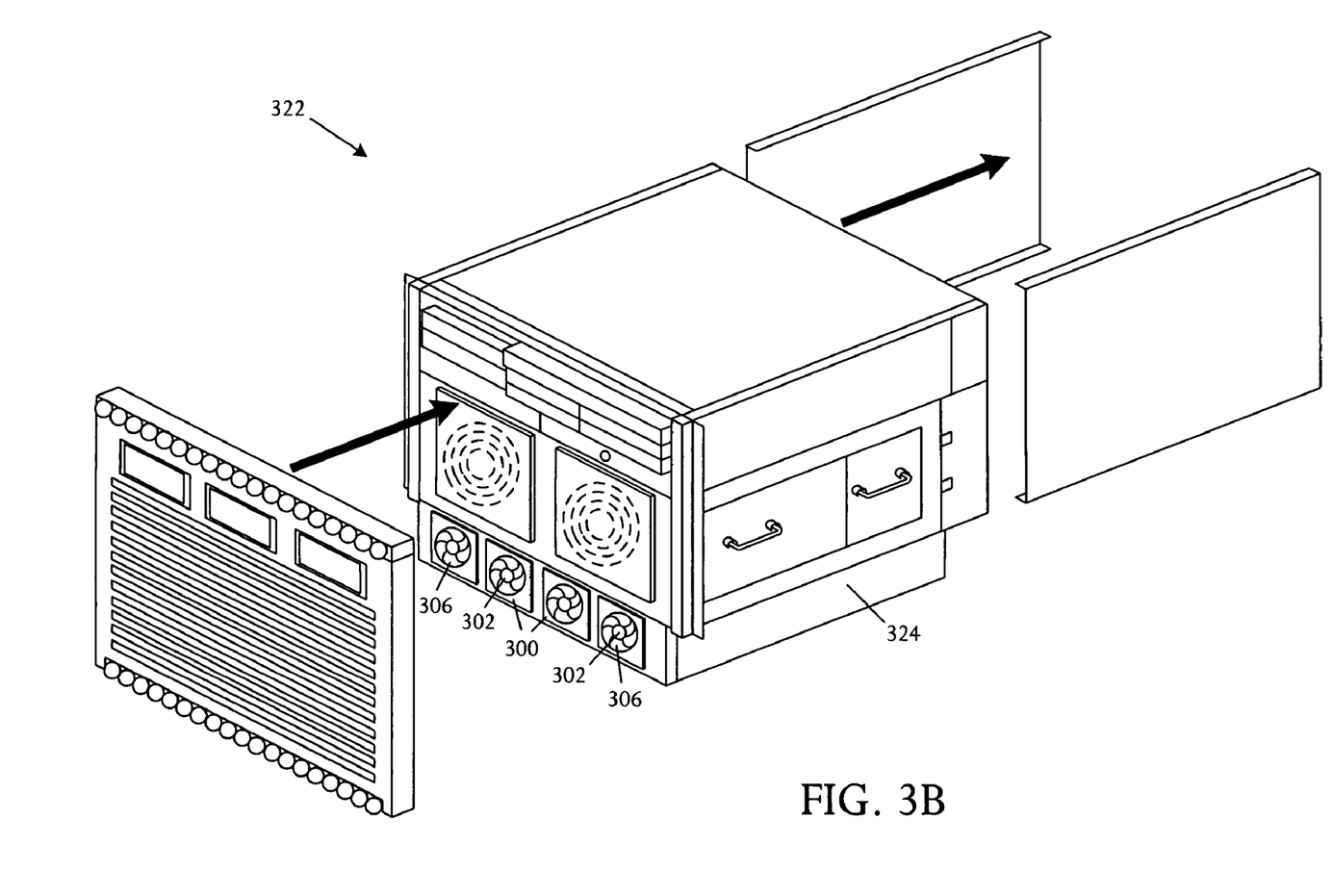

Referring to FIGS. 3A and 3B, perspective pictorial diagrams show example embodiments of electronic systems 322 comprising a chassis 324 or housing, one or more electronic components 326 contained by the chassis 324 and a plurality of electronics cooling fans 300 contained by the chassis 324. The individual electronics cooling fans 300 comprise a centrifugal clutch 302 which are adapted to disengage and freewheel upon fan failure.

In a redundant-fan electronic system 322, an electronic cooling fan 300 that is present and connected into the chassis 324 may not be required for operation and therefore power may be intentionally and selectively denied power. Accordingly, the motor would not spin and the centrifugal clutch 302 would disengage the fan blades, enabling freewheeling. The fan blades are free to spin if driven by an upstream or downstream airflow. The non-powered fan spins on a bearing, with little or no resistance. In contrast, a conventional fan without the centrifugal clutch and associated bearing system, fan blades do not spin freely since the motor is typically integral to the fan blades, so that the motor creates a resistance to spinning of the fan blades.

The multiple electronics fans 300 are arranged so that at least one non-failing electronics cooling fan remains engaged and creates airflow which can drive spinning of a failed fan. The centrifugal clutch 302 disengages the fan's blade assembly 306, enabling the blade assembly 306 to freewheel and therefore spin due to the airflow produced by the non-failing fans.

When operational and not in the failed condition, the multiple electronics cooling fans 300 are adapted for mutually independent operation.

In the failure condition, at least one non-failing fan of the series-connected electronics cooling fans 300 remains engaged and creates airflow that causes the disengaged fan to spin. Thus, a fan that is no longer operational due to failure of an attached motor or bearings is disengaged by the centrifugal clutch and enabled to freewheel. The disengaged fan begins to spin as a result of the airflow generated by the other, non-failing fans which are connected in series, even though the motor coupled to the fan is not running or is frozen in place.

The illustrative electronics cooling fans 300 and associated system 322 enable fan blades to rotate in the event of a motor or other failure, thereby reducing flow resistance. In contrast, failure of a fan motor in a conventional system results in a locked rotor fan. The locked rotor fan generally leads to a substantially increased chassis temperature in comparison to the illustrative system that disengages the fan and enables freewheeling.

Electronics cooling fan embodiments employing the centrifugal clutch 302 enable sufficient system cooling without needing more powerful fans to overcome cooling performance degradation resulting from a failed fan. The illustrative embodiments also facilitate redundant N+1 cooling.

The electronics cooling fans 300 that implement the illustrative centrifugal clutches 302 decrease flow resistance through a failed fan, enabling sufficient system cooling without adding more fans to appropriately cool components in a failed fan condition. The illustrative electronics cooling fans further enable smaller systems to be assembled, avoiding a necessity for larger fans while addressing failure due to a locked motor.

The illustrative electronic system 322 contains multiple electronics cooling fans including fans 300. The electronics cooling fans 300 are implemented with centrifugal clutch 302 designed to disengage and freewheel upon fan failure and to engage and drive rotational motion of the blade assembly 306 in response to centrifugal force generated by the motor.

The electronics cooling fans 300 are used by providing the chassis 324 which is adapted to contain one or more electronic components 326 and selectively positioning the fans 300 inside the chassis 324 in locations suitable for cooling the components 326. In a typical useful arrangement, one or more cooling fans 300 are positioned in series inside the chassis 324. The electronic system 322 may include a component 326 which is a control element such as a processor, central processing unit, computer, logic, or the like.

The centrifugal clutch 302 is actuated by radial motion and typically has radially moveable centrifugal weights mounted on a drive. Centrifugal force causes the centrifugal weights to transmit a particular torque friction to the clutch. Upon reaching a radial velocity limit, an automatic coupling occurs, resulting in a load-free startup of the drive motor. The centrifugal clutch 302 engages during normal fan operation and disengages when a fan fails, such as in conditions of motor or bearing failure, or other failure conditions. Arrangement of the fans 300 in series enables an electronics cooling fan 300 that has failed and is thus freewheeling to be driven by airflow generated by an operating redundant fan.

In a redundant fan configuration, the series fan arrangement operates to increase performance in the case of a failure associated with a fan system that results in a drop from cooling using N+1 cooling units to cooling which has N cooling units, where N designates the specified number of cooling units sufficient to cool a particular system.

Arrangement of two fans in series is a typical technique for attaining N+1 cooling, whereby a loss of one fan to leave N operating fans maintains system cooling without deleterious thermal effects. A difficulty with conventional N+1 cooling systems is that failure of one fan tends to result in airflow capability which is less than the airflow attained using N fans because the failed fan inserts airflow resistance, thereby degrading overall airflow. A motor failure that locks a fan in place accentuates the increase in airflow resistance. Usually the increased airflow resistance is compensated by over-design efforts, such as adding more fans or increasing the power of the fans, techniques that substantially increase system cost.

The illustrative electronics system 322 decreases or eliminates the cooling degradation resulting from fan failure and also enables usage of smaller cooling systems, and thus smaller electronics systems, since usage of the larger motors and/or fans sufficiently powerful to overcome a locked rotor can be avoided.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. For example, although particular types of centrifugal clutches are illustrated and described, any suitable centrifugal clutch may be used. Similarly, various simple multiple-fan arrangements are shown to facilitate expression of the structures and techniques. Any suitable number and arrangement of fans, motors, centrifugal clutches, and the like may be used and remain within the scope of the description.

In the claims, unless otherwise indicated the article "a" is to refer to "one or more than one".

What is claimed is:

1. An apparatus comprising:
    an electronics cooling fan comprising a blade assembly and a centrifugal clutch that disengages and freewheels the blade assembly upon fan failure;
    a direct current motor;
    a hub coupled to and driven by the direct current motor;
    a clutch weight assembly positioned radially surrounding the hub and having an inner surface conformal to an outer surface of the hub;
    at least one fan blade;
    an outer drum positioned radially surrounding the clutch weight assembly and having an inner surface conformal to an outer surface of the clutch weight assembly, the at least one fan blade being attached to an outer surface of the outer drum; and
    a bearing system positioned between the clutch weight assembly and the outer drum, the bearing system adapted to enable free-spinning of the outer drum and the at least one fan blade in a condition of motor and/or bearing system failure.

2. The apparatus according to claim 1 further comprising:
    a plurality of clutch mass segments forming the clutch weight assembly; and
    at least one spring coupling at least one selected segment of the clutch mass segment plurality, the at least one spring retracting the at least one selected clutch mass segment to a position adjacent the hub when the direct current motor is stationary.

3. The apparatus according to claim 1 wherein the electronics cooling fan further comprises:
the direct current motor, the centrifugal clutch rotationally coupling the motor and the blade assembly, the centrifugal clutch engaging and driving rotational motion of the blade assembly in response to centrifugal force generated by the motor.

4. The apparatus according to claim 1 wherein:
disengagement of the centrifugal clutch enables the blade assembly to freewheel in response to a predetermined reduction in centrifugal force.

5. An electronic system comprising:
a chassis;
at least one electronic component contained by the chassis; and
a plurality of electronics cooling fans contained by the chassis, ones of the electronics cooling fan plurality comprising a blade assembly and a centrifugal clutch that disengages and freewheels the blade assembly upon fan failure;
ones of the plurality of electronics cooling fans comprising:
a direct current motor;
a hub coupled to and driven by the direct current motor;
a clutch weight assembly positioned radially surrounding the hub and having an inner surface conformal to an outer surface of the hub;
at least one fan blade;
an outer drum positioned radially surrounding the clutch weight assembly and having an inner surface conformal to an outer surface of the clutch weight assembly, the at least one fan blade being attached to an outer surface of the outer drum; and
a bearing system positioned between the clutch weight assembly and the outer drum, the bearing system adapted to enable free-spinning of the outer drum and the at least one fan blade in a condition of motor and/or bearing system failure.

6. The electronic system according to claim 5 further comprising:
a plurality of clutch mass segments forming the clutch weight assembly; and
at least one spring coupling at least one selected segment of the clutch mass segment plurality, the at least one spring retracting the at least one selected clutch mass segment to a position adjacent the hub when the direct current motor is stationary.

7. The electronic system according to claim 5 further comprising:
the plurality of electronics cooling fans adapted for mutually independent operation and mutually independent engagement and disengagement by the centrifugal clutch.

8. The electronic system according to claim 5 wherein ones of the electronics cooling fans comprise:
the direct current motor, the centrifugal clutch rotationally coupling the motor and the blade assembly, the centrifugal clutch engaging and driving rotational motion of the blade assembly in response to centrifugal force generated by the motor.

9. The electronic system according to claim 5 further comprising:
at least one non-failing electronics cooling fan in the electronics cooling fan plurality configured to remain engaged and create airflow driving fan spinning of a freewheeling disengaged electronics cooling fan that has failed.

10. The electronic system according to claim 5 wherein:
disengagement of the centrifugal clutch enables the blade assembly to freewheel in response to a predetermined reduction in centrifugal force.

11. A method of cooling an electronic system comprising:
configuring an electronics cooling fan comprising a blade assembly and a centrifugal clutch adapted to disengage and freewheel the blade assembly upon fan failure;
adapting the centrifugal clutch to engage and drive rotational motion of the blade assembly in response to centrifugal force generated by the motor;
providing a direct current motor and a hub coupled to the direct current motor;
positioning a clutch weight assembly radially surrounding the hub;
configuring the blade assembly comprising the clutch weight assembly and an inner surface conformal to an outer surface of the hub;
configuring an outer drum with at least one fan blade coupled to the outer drum;
positioning the outer drum radially surrounding the clutch weight assembly:
configuring the outer drum with an inner surface conformal to an outer surface of the clutch weight assembly;
positioning a bearing system between the clutch weight assembly and the outer drum; and
adapting the bearing system to enable free-spinning of the outer drum and the at least one fan blade when the clutch mass segments are retracted.

12. The method according to claim 11 further comprising:
configuring the clutch weight assembly with a plurality of clutch mass segments; and
configuring at least one spring to couple at least one selected segment of the clutch mass segment plurality whereby the at least one spring retracts the at least one selected clutch mass segment to a position adjacent the hub when the direct current motor is stationary.

13. The method according to claim 11 further comprising:
providing a chassis adapted to contain at least one electronic component; and
positioning at least two electronics cooling fans in the chassis.

14. The method according to claim 11 further comprising:
the engaging of the centrifugal clutch occurs when the motor is operational; and
the disengaging of the clutch enables the electronics cooling fan to freewheel on motor failure.

15. The method according to claim 11 further comprising:
the engaging of the centrifugal clutch occurs during normal electronics cooling fan operation;
the disengaging of the centrifugal clutch occurs upon electronics cooling fan failure; and
freewheeling a failed electronics cooling tan, driven by airflow driven by an operational electronics cooling fan that is redundant to the failed electronics cooling fan.

16. The method according to claim 11 further comprising:
configuring the electronics cooling fan comprising the direct current motor, the blade assembly, and the centrifugal clutch rotationally coupling the motor and the blade assembly.

17. The method according to claim 11 wherein:
disengaging the centrifugal clutch enables the blade assembly to freewheel in response to a predetermined reduction in centrifugal force.

* * * * *

UNITED STATES PATENT AND TRADEMARK OFFICE
CERTIFICATE OF CORRECTION

PATENT NO. : 7,426,110 B2 Page 1 of 1
APPLICATION NO. : 11/260105
DATED : September 16, 2008
INVENTOR(S) : Christopher G. Malone et al.

It is certified that error appears in the above-identified patent and that said Letters Patent is hereby corrected as shown below:

In column 8, line 22, in Claim 11, after "assembly" delete ":" and insert -- ; --, therefor.

In column 8, line 38, in Claim 13, delete "claim 1l" and insert -- claim 11 --, therefor.

In column 8, line 54, in Claim 15, delete "tan" and insert -- fan --, therefor.

Signed and Sealed this

Sixth Day of January, 2009

JON W. DUDAS
*Director of the United States Patent and Trademark Office*